United States Patent [19]
Valentine et al.

[11] Patent Number: 5,878,115
[45] Date of Patent: Mar. 2, 1999

[54] METHOD AND APPARATUS FOR PROVIDING DIFFERENT TERMINATING CALL TREATMENTS BASED ON SERVICE AREA

[75] Inventors: Eric L. Valentine, Plano; Vladimir Alperovich, Dallas; James L. Mills, Plano; Erkki Joensuu, Plano; Mahesh Patel, Plano; David Boltz, Garland, all of Tex.

[73] Assignee: Ericsson, Inc., Research Triangle Park, N.C.

[21] Appl. No.: 643,462

[22] Filed: May 8, 1996

[51] Int. Cl.[6] .............................. H04Q 7/00; H04M 11/00
[52] U.S. Cl. .............................. 379/59; 379/58; 455/33.1
[58] Field of Search ............................ 379/58–59, 56–57; 455/33.1, 33.2

[56] References Cited

U.S. PATENT DOCUMENTS

| | | | |
|---|---|---|---|
| 5,438,609 | 8/1995 | Yahagi | 379/58 |
| 5,467,381 | 11/1995 | Peltonen et al. | 379/58 |
| 5,473,671 | 12/1995 | Partridge, III | 379/59 |
| 5,506,887 | 4/1996 | Emery et al. | 379/58 |
| 5,521,961 | 5/1996 | Fletcher et al. | 379/59 |

*Primary Examiner*—Curtis Kuntz
*Assistant Examiner*—Binh K. Tieu
*Attorney, Agent, or Firm*—Jenkens & Gilchrist

[57] ABSTRACT

A routing address representing an alternative terminal is assigned to a particular service area. Such a service area comprises a Local Access and Transport Area (LATA), Mobile Switching Center (MSC) area, Location Area, and Cell Area. Whenever an incoming call is received towards a mobile station currently located within the particular service area, instead of transmitting a routing address representing the mobile station, the serving mobile switching center (MSC) transmits a signal containing the routing address representing the alternative terminal. Instead of routing the call to the intended mobile station, the gateway mobile switching center (GMSC) utilizes the received routing address and reroutes the incoming call to the alternative terminal. By rerouting all incoming calls towards the alternative terminal in case of an emergency, all available access channels are reserved for making outgoing calls by the mobile subscribers located within the emergency service area.

29 Claims, 7 Drawing Sheets

FIG. 7

METHOD AND APPARATUS FOR PROVIDING DIFFERENT TERMINATING CALL TREATMENTS BASED ON SERVICE AREA

BACKGROUND OF THE INVENTION

1. Technical Field of the Invention

The present invention relates to a mobile telecommunications system and, in particular, to providing different terminating call treatments to an incoming call based on the called mobile station's service area.

2. Description of Related Art

It is well known to provide different terminating call treatments for incoming calls within a telecommunications system. For example, an incoming call intended for a particular subscriber can be forwarded to the subscriber's designated forward-to-number, announcement machine, or answering machine. Furthermore, depending on the directory number associated with the caller, the incoming call may also be selectively screened and rejected. The intended subscriber may also receive a different ring signal depending on the category or the directory number of the incoming caller.

These different terminating call treatments are assigned and provided per each subscriber or subscriber group. For example, a telecommunications subscriber has to have a subscription agreement with his service provider for rerouting incoming calls to a specified forward-to-number. Such a subscription service includes Call Forwarding Don't Answer (CFDA), Call Forwarding Busy (CFB), Call Forwarding Variable (CFV), etc.

Unlike wireline telecommunications systems, mobile telecommunications systems have a limited number of channels available for providing mobile service to mobile subscribers within a particular service area. Some times, especially during peak service utilization, mobile subscribers are often unable to access mobile telecommunications service because all channels are being used. In a normal situation, this is not a problem for a mobile subscriber and the serving mobile telecommunications network. The mobile subscriber merely receives a congestion tone indicating that all access channels are currently being utilized and that another attempt should be made later.

In case of an emergency, however, such a lack of service due to congestion is undesirable, and it would be desirable to leave certain access channels available to enable mobile subscribers to make outgoing emergency or high priority calls.

An illustration of such an emergency situation is an earthquake or major civil unrest covering a particular mobile service area. In those situations, all of the mobile stations located within the particular mobile service area are affected and, as a result, the serving mobile telecommunications network provider would like to remain open the radio channels to enable the mobile subscribers to make outgoing emergency or high priority calls. Incoming calls terminating to the particular mobile service area during the emergency, however, could undesirably seize these certain channels. For example, when loved ones of mobile subscribers are informed of the emergency situation, a higher number of incoming calls tend to be generated to determine the safety of the subscribers. It would be advantageous if control could be exercised while terminating such incoming calls towards the service area covering the emergency situation.

The control over the termination of incoming calls may be of some benefit in other situations as well. Such a situation is where there is a major convention or meeting being held in a particular area. Preventing the termination of incoming calls to this particular area is necessary so that sensitive proceedings will not be disturbed. In other words, a "quiet" zone is desirable within this area. If a call attempts to terminate to this area, it would be desirable to reroute, for instance, to an operator or an announcement machine.

SUMMARY OF THE INVENTION

The present invention discloses a method and apparatus for providing a different call treatment to an incoming call intended for a mobile station located within a particular service area. A routing address representing an alternative terminal is assigned to the particular service area. In case of an emergency, or other specified situations, all incoming calls terminating towards the specified service area are rerouted to the alternative terminal by transmitting the specified routing address from the serving mobile switching center (MSC) to the serving gateway mobile switching center (GMSC). The GMSC utilizes the received routing address to accordingly reroute the incoming calls to the indicated alternative terminal. The alternative terminal then informs the callers why the calls have been rerouted and further provides additional information.

The alternative terminal can be an announcement machine, an answering machine, an operator terminal, or a Private Branch Exchange (PBX). Furthermore, the alternative terminal can be associated directly with the serving MSC. As another embodiment, the alternative terminal can also be associated with a separate node connected to the serving mobile telecommunications network.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
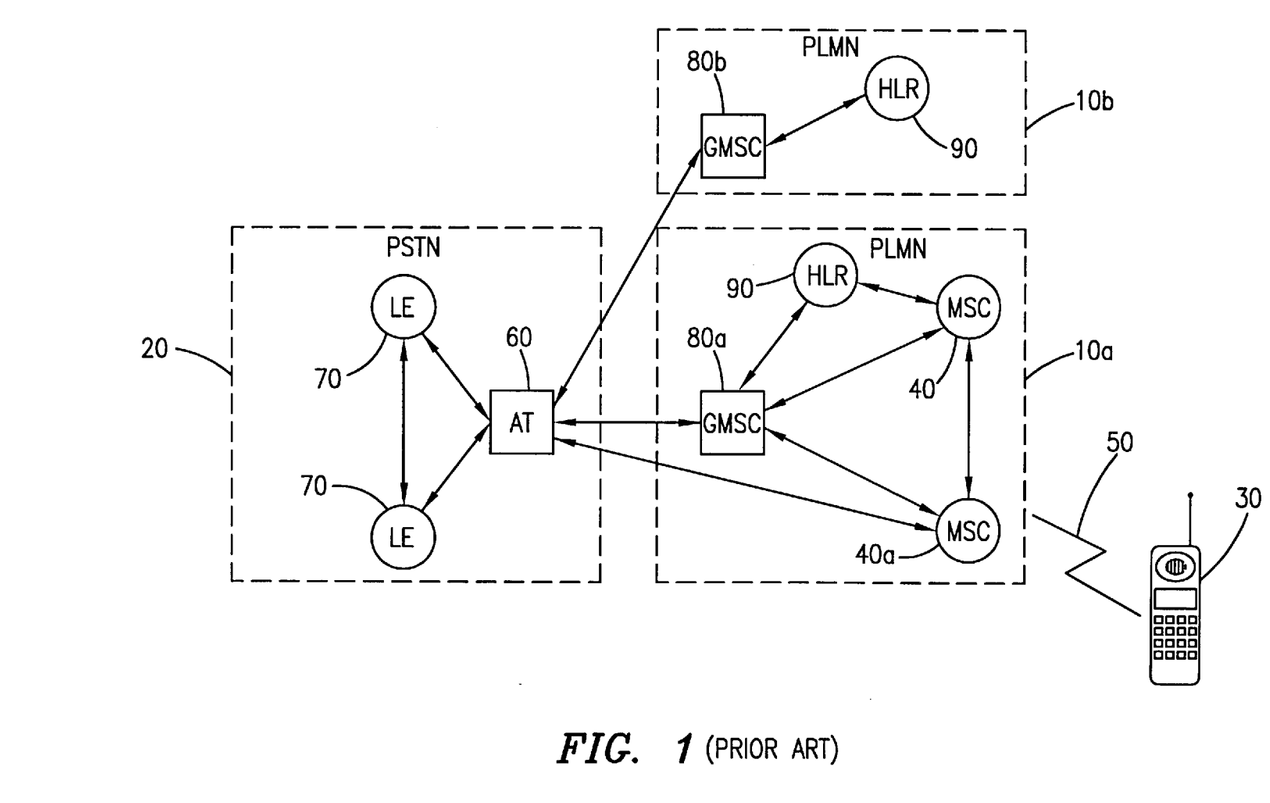
FIG. 1 is a block diagram illustrating the network interconnection of multiple Public Land Mobile networks (PLMN) to a Public Switched Telephone Network (PSTN)

FIG. 1 is a block diagram illustrating the network interconnection of multiple Public Land Mobile Networks (PLMN) 10 to a Public Switched Telephone Network (PSTN) 20. A mobile station 30 (also known as a mobile terminal or equipment) is associated with one of the PLMNs 10 as the Home PLMN 10a. Within each PLMN 10, there are a number of different mobile switching centers (MSC) 40 servicing the geographic area covered by the network. A mobile station 30 communicates with one of the MSCs 40 via over-the-air communications links 50. The mobile station 30 served by one PLMN 10 then communicates with other wireline and wireless terminals by connecting to the PSTN 20. The access tandem (AT) 60 within the PSTN 20 routes the mobile calls generated from one PLMN 10 to wire-line terminals serviced by one of its local exchanges (LE) 70 within the PSTN 20, or to another PLMN 10 by a way of its gateway mobile switching center (GMSC) 80.

For an incoming call intended for the mobile station 30, the incoming call is first routed to the GMSC 80a serving the home PLMN 10a. The GMSC 80a sends a signal requesting routing information to the home location register (HLR) 90 for that mobile station 30. The HLR 90 stores subscriber information and keeps track of the current location of the mobile station 30. After determining which MSC is currently serving the mobile station 30, the HLR 90 in turn transmits the routing instruction request signal to the serving MSC 40a. The serving MSC 40a determines the current location of the mobile station and returns a routing address representing the mobile station back to the HLR 90. After receiving the routing address from the MSC 40a, the HLR 90 further transmits the information back to the GMSC 80a. Utilizing the received routing address, the GMSC 80a transmits the incoming call to the indicated MSC 40a. The serving MSC 40a then pages and establishes a speech connection with the mobile station 30 located with its MSC serving area.

Figure 2:
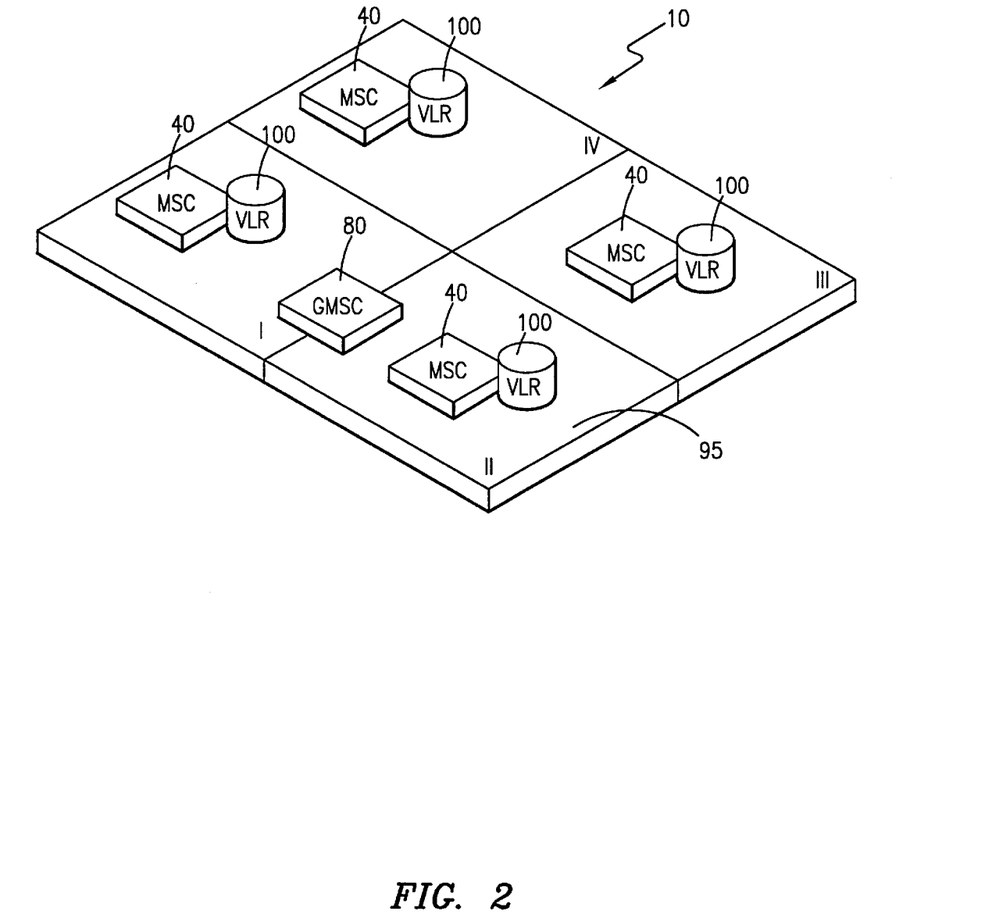
FIG. 2 is a diagram illustrating a single PLMN further comprising multiple Mobile Switching Center (MSC) areas.

Reference is now made to FIG. 2 where a layout of multiple MSC areas 95 within a particular PLMN 10 is illustrated. A PLMN network 10 is a complex configuration comprising multiple MSCs 40, VLRs 100, HLRs (not shown in FIG. 2), Gateway MSC (GMSC) 80, etc. In order to properly switch a call to a MS located within a particular PLMN, the right entities need to be invoked and involved in a call process. The individual PLMN 10 may contain parts of one or more single Local Access Transport Areas (LATA). There are over three hundred LATAs presently defined throughout the United States. As shown in FIG. 2, within each LATA, there are multiple MSC/VLR areas each being served by an individual MSC/VLR (usually there is a one-to-one relationship between a MSC and its VLR and is often referenced collectively as a MSC/VLR).

Figure 3:
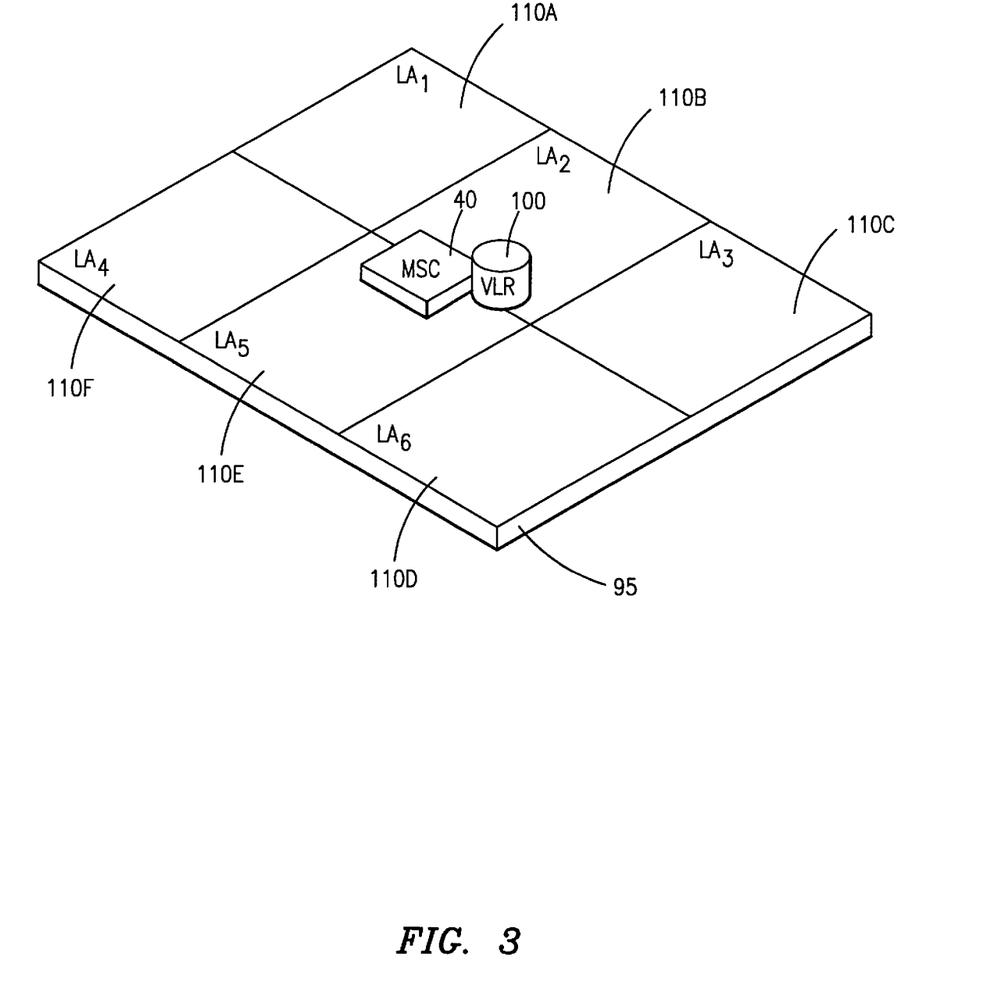
FIG. 3 is a diagram illustrating a single MSC further comprising multiple Location Areas (LA)

FIG. 3 illustrates multiple Location Areas 110A–110F within a particular MSC area 95. A Location Area is a part of the MSC Service Area in which a mobile station may move freely without updating location information to the MSC/VLR that serves the Location Area. Therefore, a Location Area is the area where a paging message is broadcast to find the called mobile station. A Location Area Identity (LAI) which identifies each Location Area is used by the mobile network to search for a mobile station in active state.

Figure 4:
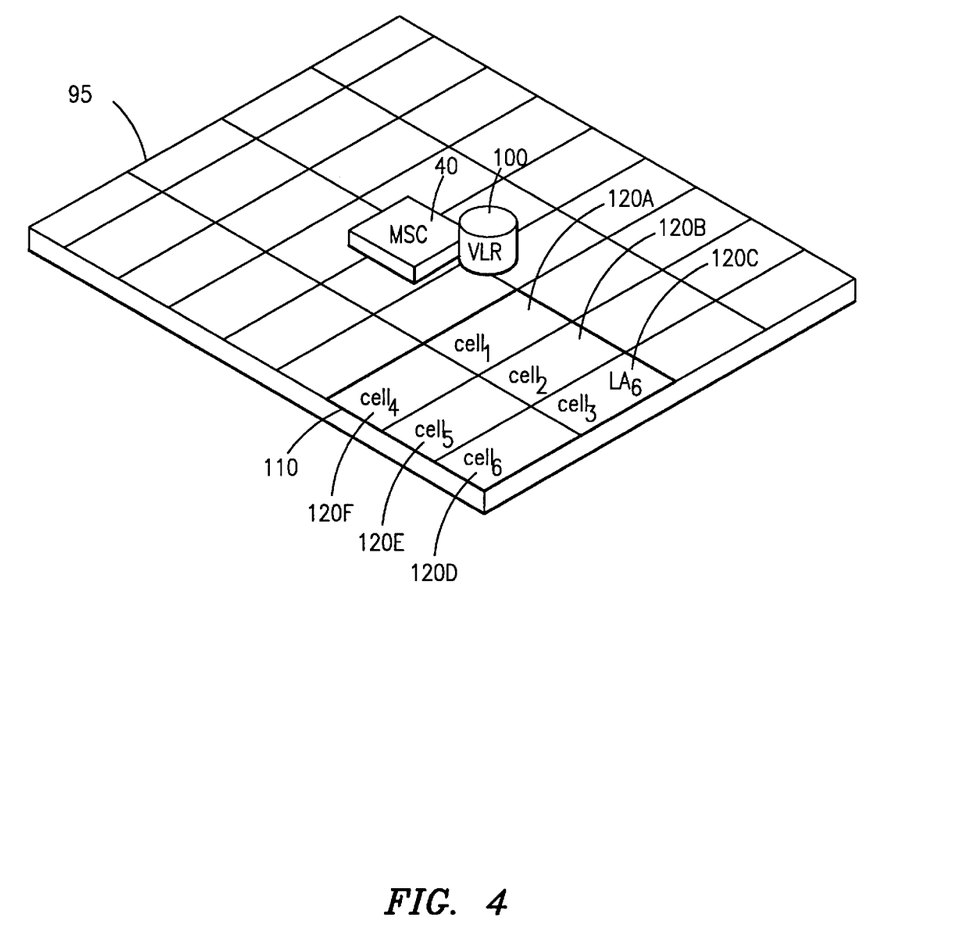
FIG. 4 is a diagram illustrating a single Location Area further comprising multiple Cell Areas.

Referring to FIG. 4, each Location Area 110 is further divided into multiple Cell Areas 120A–120F. Again, these Cell Areas within the Location Area 110 are served by the same MSC 40 and VLR 100. The serving mobile network identifies a particular radio coverage area known as a Cell Area using a Cell Global Identity (CGI). Different Cell Areas within a single Location Area are distinguished using a Base Station Identity Code (BSIC) assigned to each serving base station.

Figure 5:
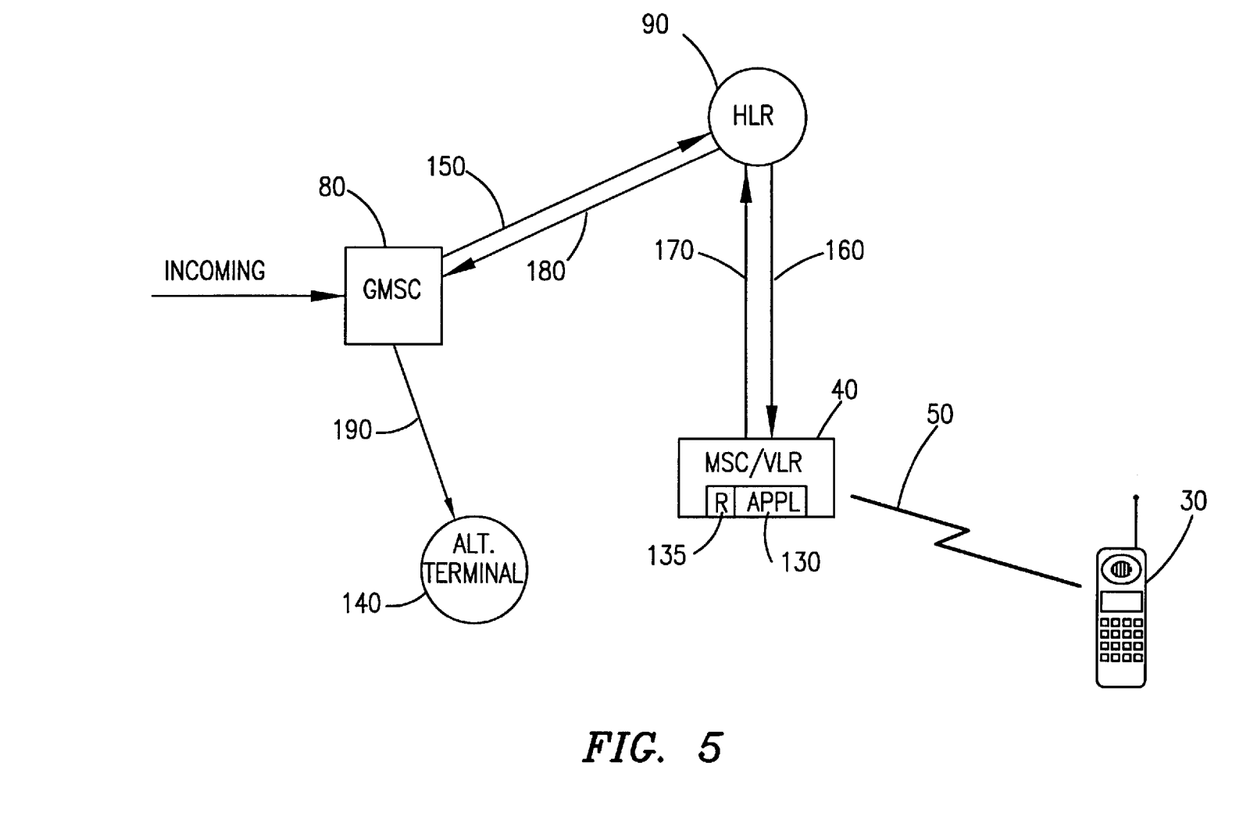
FIG. 5 is a diagram illustrating a gateway mobile switching center (GMSC) communicating routing instruction with a MSC for rerouting an incoming call towards an alternative terminal in accordance with the teachings of the present invention.
Figure 6:
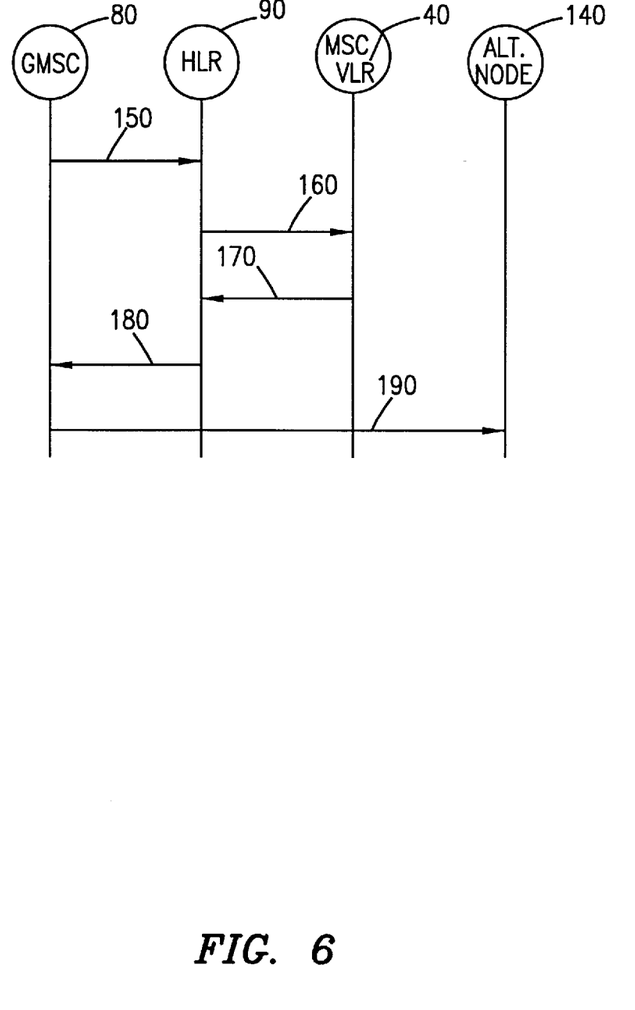
FIG. 6 is a signal sequence diagram illustrating a gateway mobile switching center (GMSC) communicating routing instruction with a MSC for rerouting an incoming call towards an alternative terminal.

Reference is now made both to FIGS. 5 and 6 where a GMSC 80 is illustrated communicating routing instructions with a MSC 40 for rerouting an incoming call towards an alternative terminal 140 in accordance with the teachings of the present invention. An incoming call towards a mobile station 30 is first received by the GMSC 80 associated with the home HLR 90 serving the mobile station 30. By analyzing the received directory number, known as a Mobile Station Integrated Services Digital Network (MSISDN) number, the GMSC 80 determines the network address representing the HLR associated with the intended mobile station and transmits a signal 150 requesting routing instruction to the determined HLR 90. The HLR 90 stores information indicating which MSC/VLR 40 is currently serving the mobile station 30 and, in turn, transmits a signal 160 requesting routing instruction to the appropriate MSC/VLR 40. After receiving the signal requesting routing instruction, the serving MSC/VLR determines the geographic area where the mobile station 30 is currently located by determining the particular Cell currently serving the mobile station 30. By determining the serving Cell, as illustrated in FIGS. 3–4, the serving MSC/VLR is able to determine which Cell Area, Location Area, MSC area and LATA which are currently covering the mobile station 30. After determining the current location of the mobile station 30, the application module 130 within the serving MSC/VLR 40 determines whether a different call treatment should be applied for the incoming call terminating to this particular service area.

For example, after determining the current location of the mobile station 30, the MSC/VLR 40 determines if a routing address representing an alternative terminal 140 has been assigned to the particular service area and whether that call treatment should be provided. Such may occur during an emergency where limitations have been placed on the termination of calls to the particular service area. Furthermore, a mobile subscriber and its associated mobile station can be assigned a number of different subscriber categories. Depending on the specific subscriber category assigned to the mobile station 30 within the targeted service area, the alternate call treatment can be selectively applied. By assigning a particular subscriber category to the mobile station 30, the mobile station 30 is still able to receive incoming calls within the particular service area regardless of the provision of the alternate call treatment by the application module 130.

In response to an affirmative determination, instead of transmitting a routing address representing the mobile station 30 to facilitate the delivery of the incoming call to the mobile station 30, the routing address stored in a storage register (R) 135 is retrieved and transmitted to the requesting HLR 90 via a signal 170. The HLR 90 transparently forwards the signal containing the routing address to the original GMSC 80 via a signal 180. After receiving the signal 180, the GMSC 80 reroutes the incoming call to the alternative terminal 140 as indicated by the routing address transmitted by the MSC/VLR 40 (signal 190).

The alternative terminal 140 may comprise an announcement machine informing the callers why their calls have been diverted and further providing information regarding, for example, the emergency situation covering the particular service area. The alternative terminal 140 may also comprise an operator terminal where a live operator may answer the call and provide the necessary information. As another embodiment, the alternative terminal comprises a Private Branch Exchange (PBX) where a number of above announcement machines or operators can be simultaneously provided.

A service area as disclosed in accordance with the teachings of the present invention includes a LATA, a MSC/VLR area, a Location Area (LA) and a Cell Area. For example, each mobile service provider PLMN is associated with at least one LATA. By assigning a routing address representing the alternative terminal 140 with the particular LATA area, all incoming calls terminating within the particular LATA area can be screened and be routed to the alternative terminal 140. Each PLMN is further subdivided into a number of MSC/VLR areas. By assigning a routing address representing the alternative terminal 140 with a particular MSC/VLR area, all incoming calls terminating within the particular MSC/VLR area can be rerouted to the alternative terminal 140. Furthermore, each MSC/VLR area is also subdivided into a number of Location Areas (LA). Similarly, by assigning a routing address representing the alternative terminal 140 with a particular Location Area, all incoming calls terminating within the particular Location Area can be provided a different terminating call treatment. Lastly, each Location Area is further subdivided into a number of Cell Areas. By assigning a routing address representing the alternative terminal 140 with a particular Cell Area, all incoming calls terminating within the particular Cell Area can also be provided a different call treatment.

Figure 7:
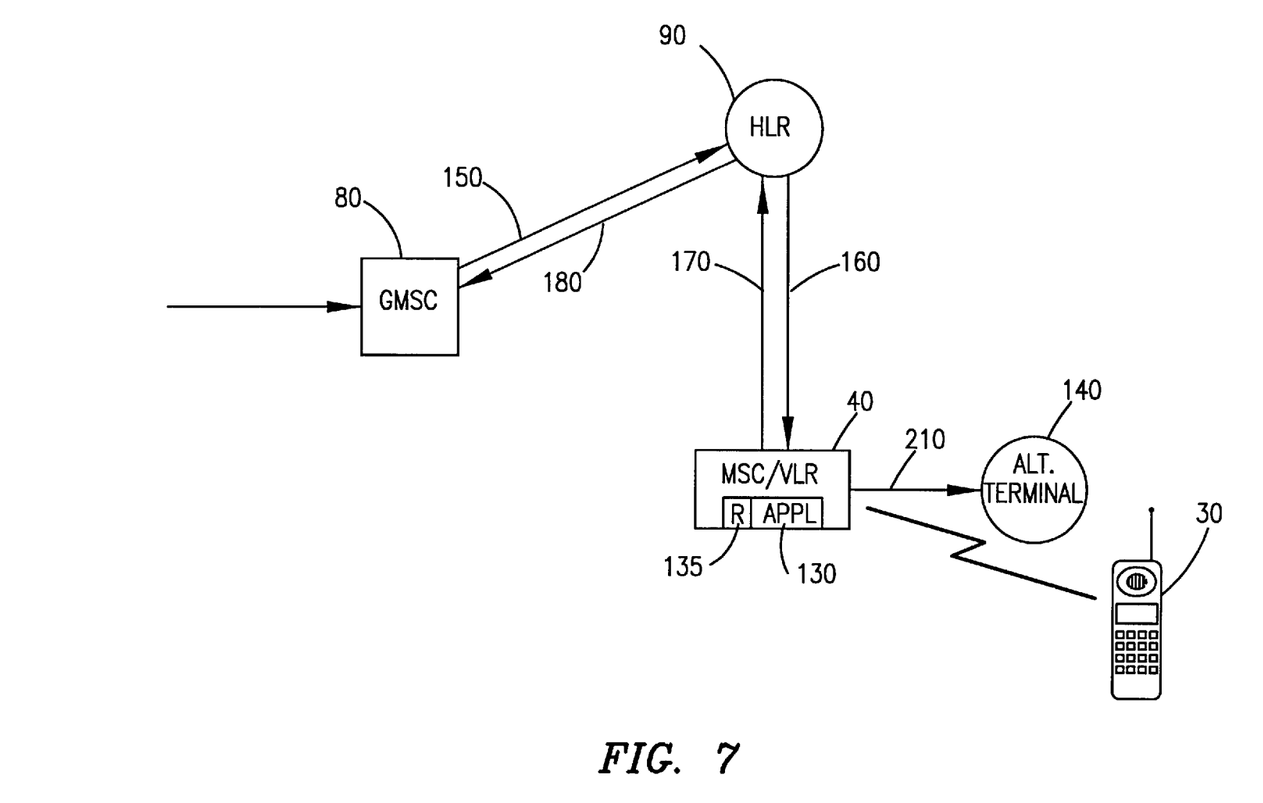
FIG. 7 is a block diagram illustrating an alternative terminal connecting to the serving MSC.

Now referring to FIG. 7 where a block diagram illustrating the alternative terminal 140 connecting to the serving MSC/VLR 40 is shown. Instead of being associated with the home PLMN as an external node, the alternative terminal 140 is connected to and served by the MSC/VLR 40. As described in FIG. 5, the incoming call is first received by the GMSC 80. The GMSC 80 sends the signal 150 requesting routing instruction to the serving HLR 90. The serving HLR 90, in turn, sends the signal 160 requesting routing instruction to the serving MSC/VLR. The application module 130 within the serving MSC/VLR 40 determines that a different call treatment needs to be provided for the specific service area where the mobile station 30 is currently located. The application module 130 then retrieves the routing address representing the alternative terminal 140 from the storage register 135. The alternative terminal 140, however, is connected directly to the serving MSC/VLR 40 and the routing address represents one of the internal addresses handled by the MSC/VLR itself. The routing address is delivered to the HLR 90 via the signal 170 and, in turn, routed to the GMSC 80 via the signal 180. The GMSC 80, in response to the receipt of the routing address, routes the incoming call to the MSC/VLR 40 via a signal 200. Instead of paging and connecting the incoming call with the mobile station located within the particular service area, the MSC/VLR 40 connects the incoming call with the alternative terminal 140 as indicated by the received routing address. As a result, once the application module 130 determines that the different call treatment needs to be provided for the particular service area, the HLR 90 and the GMSC 80 transparently processes the call as indicated by the generated routing address without realizing that the incoming call is being routed to a different terminal.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for rerouting an incoming call intended for a mobile station to an alternative terminal, said method comprising the steps of:

receiving a first signal requesting routing instruction for said incoming call, said first signal received within a mobile switching center/visitor location register (MSC/VLR) currently serving said mobile station;

determining at said MSC/VLR a particular service area where said mobile station is currently located;

determining at said MSC/VLR whether a different routing treatment should be applied for said particular service area; and retrieving a routing address assigned to said particular service area, wherein said routing address represents said alternative terminal; and transmitting a second signal containing said routing address by said MSC/VLR instructing said incoming call to be routed to said alternative terminal.

2. The method of claim 1 wherein said particular service area is a mobile service area selected from a group consisting of:

a Local Access and Transport Area (LATA);

a Mobile Switching Center (MSC) area;

a Location Area (LA); or a Cell Area (CA).

3. The method of claim 1 wherein said alternative terminal comprises an announcement machine.

4. The method of claim 1 wherein said alternative terminal comprises an operator terminal.

5. The method of claim 1 wherein said alternative terminal comprises a Private Branch Exchange (PBX).

6. The method of claim 1 wherein said alternative terminal is connected to said MSC.

7. The method of claim 1 wherein said step of determining further comprises the steps of:

retrieving a subscriber category assigned to said mobile station; and determining whether said different routing treatment should be applied for said retrieved subscriber category.

8. A method for rerouting an incoming call intended for a mobile station located within a particular service area, wherein said particular service area is served by a mobile switching node and all incoming calls terminating within said particular service area need to be rerouted to an alternative terminal, said method comprising the steps of:

receiving a first signal requesting routing instruction associated with said incoming call by said mobile switching node;

determining at said mobile switching node whether said mobile station is within said particular service area; and in response to an affirmative determination:

determining a routine address assigned to said service area wherein said routing address represents said alternative terminal; and transmitting a second signal containing said routine address by said mobile switching node wherein said routing address instructs said incoming call to be routed to said alternative terminal.

9. The method of claim 8 wherein said particular service area is a mobile service area selected from a group consisting of:

a Local Access and Transport Area (LATA);

a Mobile Switching Center (MSC) area;

a Location Area (LA); or a Cell Area (CA).

10. The method of claim 8 wherein said alternative terminal comprises an announcement machine.

11. The method of claim 8 wherein said alternative terminal comprises an operator terminal.

12. The method of claim 8 wherein said alternative terminal comprises a Private Branch Exchange (PBX).

13. The method of claim 8 wherein said mobile switching node comprises a mobile switching center (MSC) serving said particular service area.

14. The method of claim 8 wherein said step of determining further comprises the step of:

retrieving a subscriber category assigned to said mobile station; and determining whether said incoming calls towards said mobile station with said retrieved subscriber category need to be rerouted.

15. A mobile switching center (MSC) for rerouting an incoming call intended for a particular mobile station to an alternative terminal, said MSC comprising:

means for receiving a first signal requesting routing instruction for delivering said incoming call to said mobile station;

means for determining a particular service area said mobile station is currently located;

means for determining whether a different call treatment should be applied for said particular service area; and means responsive to an affirmative determination for retrieving a routing address assigned to said particular service area, wherein said routing address represents said alternative terminal and for transmitting a second signal containing said routing address, said routing address instructing said incoming call to be routed to said alternative terminal.

16. The MSC of claim 15 wherein said particular service area is a service area selected from a group consisting of:

a Local Access and Transport Area (LATA);

a Mobile Switching Center (MSC) area;

a Location Area (LA); or a Cell Area (CA).

17. The MSC of claim 15 wherein said alternative terminal comprises an announcement machine.

18. The MSC of claim 15 wherein said alternative terminal comprises an operator terminal.

19. The MSC of claim 15 wherein said alternative terminal comprises a Private Branch Exchange (PBX).

20. The MSC of claim 15 wherein said alternative terminal is associated with said MSC.

21. The method of claim 15 wherein said mobile station is assigned a particular subscriber category and wherein said means for determining further comprises means for determining whether said different routing treatment should be applied towards said mobile station with said particular subscriber category.

22. A mobile telecommunications system comprising:

a telecommunications node serving a plurality of service areas, a certain one of said plurality of service areas subject to an alternative routing instruction for terminating incoming calls;

an alternative terminal associated with a routing address, said routing address further assigned to said certain one of said plurality of service areas;

means for determining that an incoming call is to be terminated to a mobile station currently located within said certain one of said plurality of service areas; and means associated with said telecommunications node for routing said incoming call using said routing address to said alternative terminal for handling instead of to said mobile station.

23. The mobile telecommunications system of claim 22 wherein said means for routing comprises:

a Gateway Mobile Switching Center (GMSC) for transmitting a first signal requesting routing instruction for delivering said incoming call to said mobile station; and a mobile switching center (MSC) in response to said first signal comprising:

means for determining whether said alternative routing instruction should be applied for said mobile station; and means responsive to an affirmative determination for transmitting a second signal containing routing instruction by said MSC wherein said routing instruction instructs said incoming call to be routed to said alternative terminal.

24. The mobile telecommunications system of claim 22 wherein said plurality of service area comprise one or more of:

a Local Access and Transport Areas (LATA);

a Mobile Switching Center (MSC) area;

a Location Area (LA); and a Cell Area (CA).

25. The mobile telecommunications system of claim 22 wherein said alternative terminal comprises an announcement machine.

26. The mobile telecommunications system of claim 22 wherein said alternative terminal comprises an operator terminal.

27. The mobile telecommunications system of claim 22 wherein said alternative terminal comprises a Private Branch Exchange (PBX).

28. The mobile telecommunications system of claim 22 wherein said means for determining further comprises:

means for determining one of said plurality of service areas said mobile station is currently located; and means for determining said alternative terminal associated with said one of said plurality of service areas.

29. The mobile telecommunications system of claim 22 wherein said mobile station is associated with a subscriber category value and wherein said means for determining further comprises means for further determining whether said incoming call should be routed for said subscriber category.

* * * * *

UNITED STATES PATENT AND TRADEMARK OFFICE
CERTIFICATE OF CORRECTION

PATENT NO. : 5,878,115
DATED : Mar. 2, 1999
INVENTOR(S) : Valentine et al.

It is certified that error appears in the above-identified patent and that said Letters Patent is hereby corrected as shown below:

Column 6, line 51    Replace "routine"
                         With --routing--

Column 6, line 54    Replace "routine"
                         With --routing--

Signed and Sealed this

Tenth Day of August, 1999

*Attest:*

Q. TODD DICKINSON

*Attesting Officer*    *Acting Commissioner of Patents and Trademarks*